Jan. 14, 1930.  R. V. PRICE  1,744,002
CONTROLLING VALVE FOR PUMPS
Original Filed Nov. 24, 1924   2 Sheets-Sheet 1
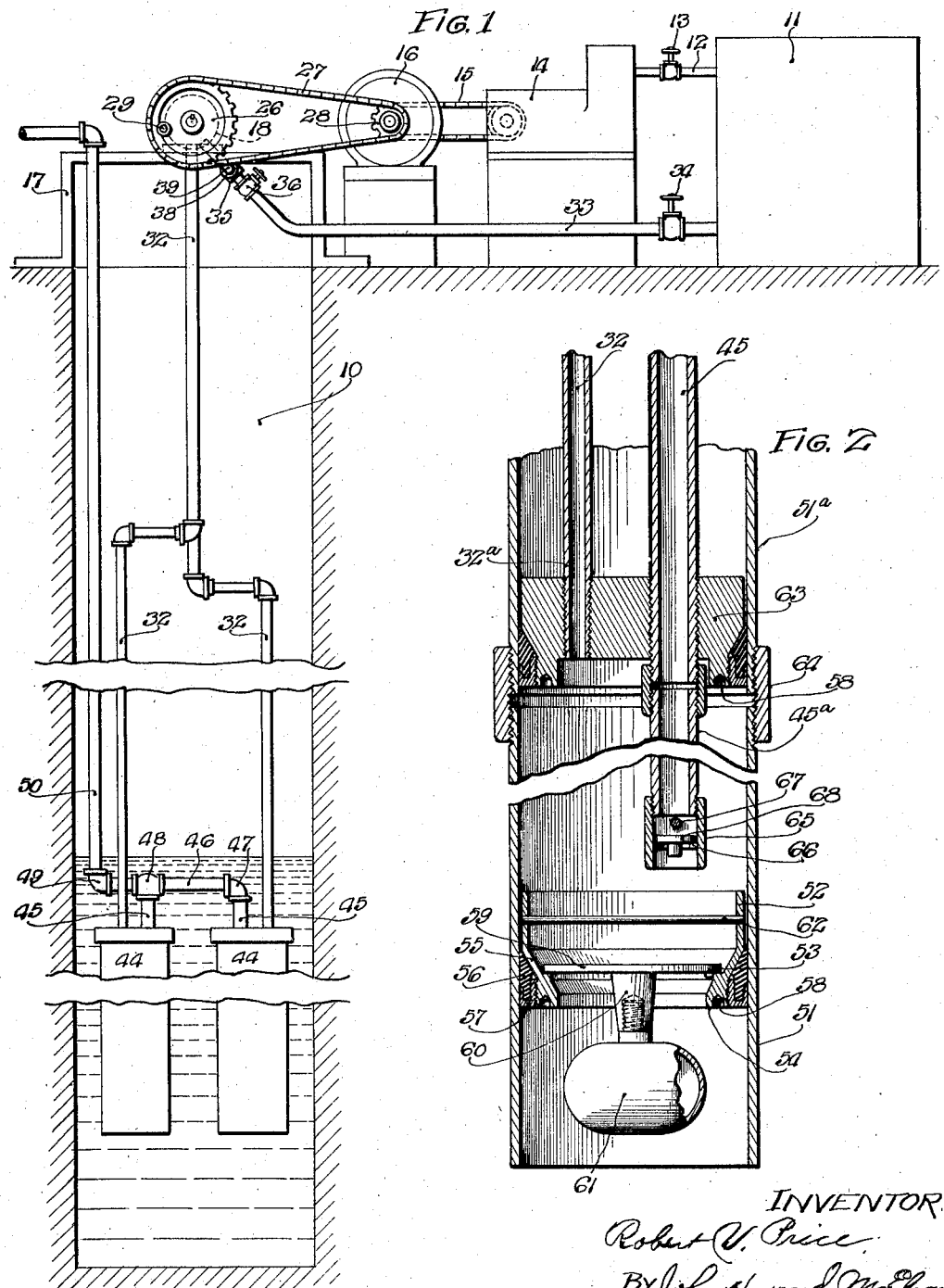
INVENTOR.
Robert V. Price.
By John Howard McElroy
HIS ATTY.

Jan. 14, 1930.  R. V. PRICE  1,744,002
CONTROLLING VALVE FOR PUMPS
Original Filed Nov. 24, 1924   2 Sheets-Sheet 2
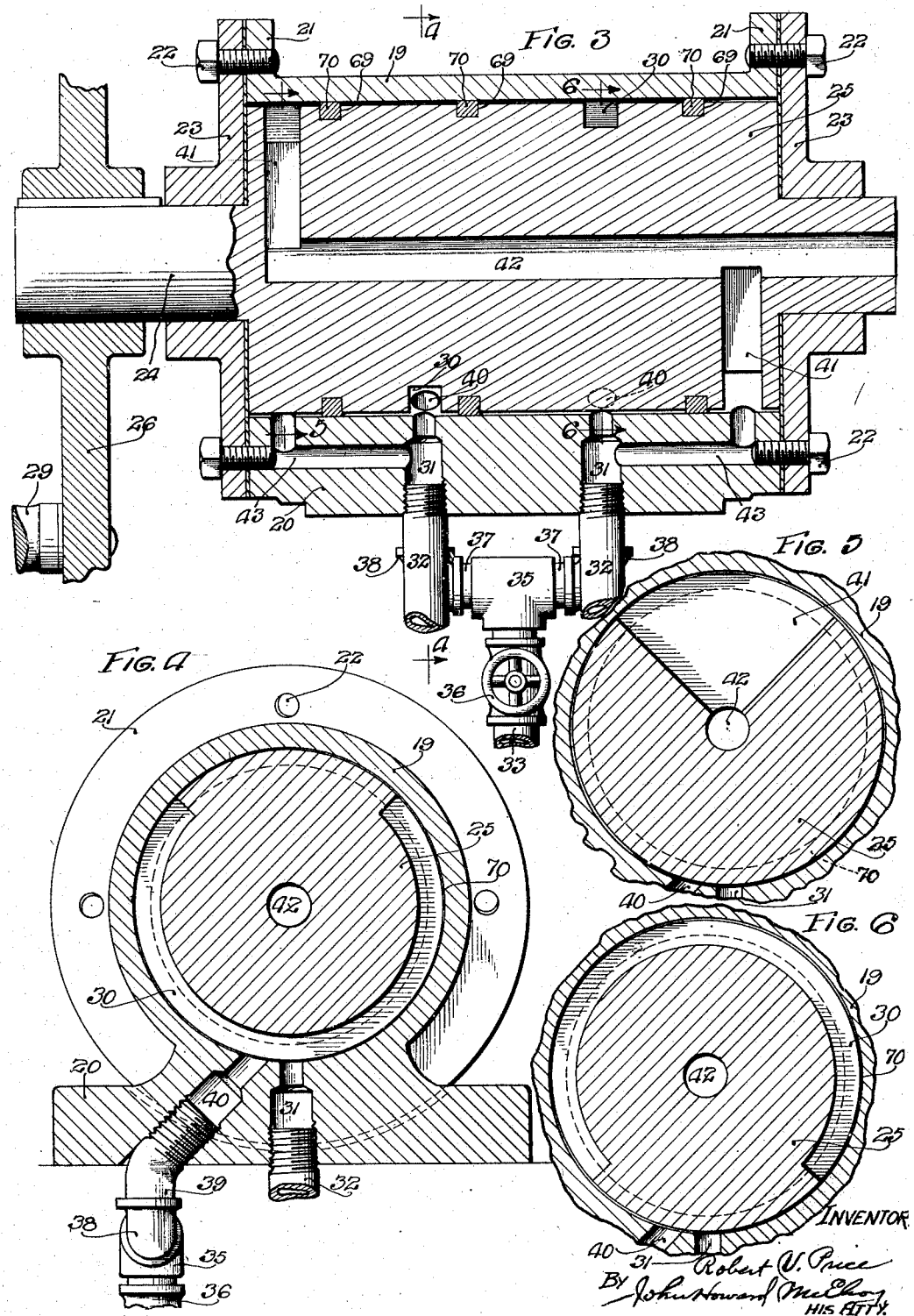

Patented Jan. 14, 1930

1,744,002

UNITED STATES PATENT OFFICE

ROBERT V. PRICE, OF CALGARY, ALBERTA, CANADA

CONTROLLING VALVE FOR PUMPS

Application filed November 24, 1924, Serial No. 752,012. Renewed June 28, 1929.

My invention is concerned with controlling valves for pumps operated by compressed air or other gases and employed in the elevation of water or any desired liquid from wells, mines, etc., and is designed to produce a device of extreme simplicity which will be capable of operating successfully under a wide variation in the air pressure employed and in the height to which the liquid is elevated.

To illustrate my invention, I annex hereto two sheets of drawings in which the same reference characters are used to designate identical parts in all the figures of which—

Fig. 1 is a view, somewhat diagrammatic, illustrating the complete apparatus as applied to a well without a casing or with casing of large diameter and in duplex form to produce a substantially constant flow;

Fig. 2 is a sectional view of a portion of the well casing with my invention applied thereto and the casing utilized to form the walls of an air or water chamber;

Fig. 3 is a central vertical section of a specific valve structure which I preferably employ with the duplex system illustrated in Fig. 1; and Figs. 4, 5 and 6 are details in section on the lines 4—4, 5—5 and 6—6, respectively, of Fig. 3.

In carrying out my invention in its preferred form, I locate adjacent to the well 10 from which the water is to be lifted, a compressed air tank 11 of sufficient capacity so that any ordinary amount of water can be lifted for domestic purposes or otherwise, and I connect this compressed air tank 11 by a pipe 12 having a shut-off cock 13 therein to an air compressor 14, which may be driven by any available power, such as a windmill, electric motor, gas engine, etc., and this air compressor is connected by suitable gearing such as sprocket wheels and chain 15 with a motor 16, which is preferably located at some suitable point relative to the opening of the well. I have illustrated diagrammatically a support 17 as located over the top of the well and carrying the valve 18, which as seen in Figs. 3 and 4 consists of the cylindrical casing 19 mounted upon the supporting base 20, which in turn will be carried by the support 17. In its preferred construction, the cylindrical casing 19 is provided with the annular flanges 21 at its ends, which flanges are connected by the screws 22 with the ends 23 which have bearings for the shaft 24, which may be integral with the valve 25, if desired. On one end of the shaft 24 is secured the sprocket wheel 26 or whatever other gearing is employed to connect the valve with the motor 16, the sprocket chain 27 and sprocket pinion 28 being preferably employed for this purpose. On the sprocket wheel 26, I preferably locate a handle 29 so that the valve can be operated by hand, if desired.

Where the valve is adapted for a duplex operation, I locate in the periphery of the rotating valve member 25 a pair of grooves or channels 30, which are adapted to co-operate with a pair of bores 31 formed in the base 20, having the small pipes 32 leading downward therefrom into the well. The supply of compressed air is preferably taken from the tank 11 through the pipe 33 having the shut-off cock 34 therein and terminating in a T 35, and I may employ another shut-off cock 36 in the pipe 33 adjacent the T. This T is connected by the short unions 37 and the elbows 38 with the short pipes 39 threaded into the bores 40 likewise formed in the base 20 and opening adjacent the ports 31 with which they communicate when the channels 30 are over said ports. Their communication is shut off by the unchanneled portion of the periphery, and coinciding with the unchanneled portion I provide the exhaust passages 41, preferably segmental in their outline and opening into the central exhaust port 42 which opens to the atmosphere, as will be readily apparent. The ports 31 are connected with these exhaust passages 41 by the ports 43 which are formed in the base 20 and terminate in the vertical planes of the exhaust passages 41. It will of course be understood that the passages 41 and the channels 30 are diametrically opposed to each other so that there is always a supply of compresed air flowing into the well so as to discharge the water therefrom in a continuous stream where the duplex arrangement shown is employed.

The pipes 32 are passed through the closed tops of the air chambers 44, which are located in the well in such a position that the water normally stands substantially as high as their tops. The bottom of these chambers will be provided with some form of valve which automatically opens to admit the water to the bottom of the chamber when there is no air pressure on the chamber, and which will close when air pressure is applied. To carry out the water, I employ in each chamber a water discharge pipe 45, which will extend to near the bottom of the chamber and be provided with an upwardly opening check valve. In a duplex system, these pipes 45 preferably open into the common horizontal connection or header 46 by the elbow 47 and the T 48, and this header 46 is connected by the elbow 49 with the water delivery pipe 50 which of course extends to the top of the well from which point it can be led off to any desired place, whether to a house to furnish water supply, or for fire protection, or to a field for irrigation or to whatever place the water is used.

The general operation of the system will be readily aparent: Assuming that the tank 11 is full of compressed air, then if the valve 25 is turned by hand or by the motor so as to bring the channel or channels 30 into connection with the compressed air supply, the pressure will pass downward through the pipes 32 and force the water trapped in the air chamber 44 up through the pipe 50. If the valve 25 is operated by hand, and it is desired to deliver less than the capacity of the chamber 44 the valve will be turned back as soon as the desired quantity of water is lifted so as to bring the unchanneled portion of the valve into register with the ports 31 and 40, and when this occurs, the pipe 32 is connected with the exhaust, and the compressed air in the chamber 44 is allowed to escape and the water will rise in the chamber and fill the same. Where in a duplex system the valve is driven by the motor continuously, the pumping is constant, as the pressure of the air relative to the size of the chamber and the rapidity with which the water can enter will be regulated so that one chamber will be filled with the water while the compressed air is exhausting therefrom and the other chamber will at the same time be emptied of water.

Where a well of a smaller bore is to have the water elevated therefrom, I preferably employ the construction shown in Fig. 2, where it will be seen that the lower end of the casing section 51 is closed by the novel construction therein shown, which consists of a sleeve 52 having the valve seat 53 on its interior and having its larger top connected with the smaller bottom portion 54 by an inclined portion 55 which is adapted to co-operate with the compressible and elastic packing 56, which is supported in and secured to the packing ring 57. The interior of the ring 57 as well as the exterior of the reduced portion 54 are threaded and both the sleeve and the ring are provided with recesses 58 or some suitable means by which wrenches can be applied so that the device can be secured airtight and firmly in place near the end of the casing section simply by screwing the two parts together, thereby compressing the packing 56 against the inner wall of the casing with sufficient force to hold it in place against the air pressure applied thereto. Co-operating with the valve seat 53 is the upwardly opening valve disk 59, which is preferably provided with the downwardly extending stem 60, to which is connected the hollow metallic float 61 which tends to keep the valve open, its upward movement being limited by the rod 62 secured across the top of the sleeve for this purpose. If the water is of a character that needs straining, for this rod 62 I may substitute any desired form of a screen which will thus have the double function of straining the water and holding the valve in place. At a suitable distance above, preferably in the bottom of an adjacent section 51ᵃ of the casing, I secure the somewhat similar plug 63, which corresponds to the sleeve 52 except that it is solid, and has the pipe 45ᵃ passed therethrough and the pipe section can be threaded therethrough as shown, or secured in place by collars co-operating therewith and with the plug 63. The end of the pipe 32ᵃ will likewise be threaded into the plug 63, and after said plug is secured in place by the same means as the plug in the bottom section of the casing, the adjacent ends of the casings can be united by the coupling ring 64 in a manner well understood. To furnish a check valve for the bottom of the pipe 45ᵃ, I preferably employ a small union 65 having the valve seat 66 and the stop pin 67 therein and adapted to receive the poppet valve 68, which will operate in a manner readily understood. It will be noted that I have formed in the valve body 25 the three or more annular rectangular grooves 69 in which I have placed the expanding piston rings 70 so as to prevent leakage between the different portions of the valve. Of course it will be understood that I might substitute some other form of packing for these piston rings 70.

While I have shown and described my invention as embodied in the form which I at present consider best adapted to carry out its purposes, it will be understood it is capable of modifications, and that I do not desire to be limited in the interpretation of the following claims except as may be necessitated by the state of the prior art.

What I claim as new and desire to secure by Letters Patent of the United States is:

1. A valve for the purpose described, consisting of a cylindrical casing having two ports in the same transverse plane, one of said ports having a branch which opens on the interior of the cylinder only in a different transverse plane from the other interior opening of the same port, and a cylindrical valve rotating in said casing and having a peripheral channel in the transverse plane common to the two ports long enough to connect said two ports and another channel not in the same sector as the first channel and in the transverse plane of the branch opening, and means connecting the second channel with the exterior of the cylinder.

2. A valve for the purpose described, consisting of a cylindrical casing having two ports in the same transverse plane, one of said ports having a branch which opens on the interior of the cylinder only in a different transverse plane from the other interior opening of the same port, and a cylindrical valve rotating in said casing and having a peripheral channel in the transverse plane common to the two ports long enough to connect said two ports and another channel not in the same sector as the first channel and in the transverse plane of the branch opening, means connecting the second channel with the exterior of the cylinder, and a packing ring in the valve cooperating with the interior of the valve casing and located between the two channels.

3. A valve for the purpose described, consisting of a cylindrical casing having two ports in the same transverse plane, one of said ports having a branch which opens on the interior of the cylinder only in a different transverse plane from the other interior opening of the same port, and a cylindrical valve rotating in said casing and having a peripheral channel in the transverse plane common to the two ports long enough to connect said two ports and another channel not in the same sector as the first channel and in the transverse plane of the branch opening, said second channel connecting with a central bore extending longitudinally of the valve and through one of the bearings of the valve to the atmosphere.

4. A valve for the purpose described, consisting of a cylindrical casing, each transverse half thereof having two ports in the same transverse plane, one of said two ports having a branch which opens on the interior of the cylinder only and in a different transverse plane from the other interior opening of the same port, a cylindrical valve body rotating in said casing and each transverse half having one peripheral channel in the transverse plane of said two ports and long enough to connect them and also having another channel not in the same sector as the first channel and in the transverse plane of the branch opening, means connecting the second - mentioned channel of each half with the exterior of the cylinder, and three packing rings in the valve body co-operating with the interior of the valve casing and located so as to separate each of all four of the channels from the other three.

5. A valve for the purpose described, consisting of a cylindrical casing, each transverse half thereof having two ports in the same transverse plane, one of said two ports having a branch which opens on the interior of the cylinder only and in a different transverse plane from the other interior opening of the same port, a cylindrical valve body rotating in said casing and each transverse half thereof having one peripheral channel in the transverse plane of said two ports and long enough to connect them and also having another channel not in the same sector as the first channel and in the transverse plane of the branch opening, the second-mentioned channel of each half connecting with a central bore extending longitudinally of the valve body and through one of the bearings thereof to the atmosphere, and three packing rings in the valve body cooperating with the interior of the valve casing and located so as to separate each of all four of the channels from the other three.

ROBERT V. PRICE.